United States Patent [19]

Dixon

[11] Patent Number: 4,757,803
[45] Date of Patent: Jul. 19, 1988

[54] SOLAR HEATER FOR MOUNTING ON A BOAT

[76] Inventor: Larry J. Dixon, 4302 E. Rose Marie La., Phoenix, Ariz. 85032

[21] Appl. No.: 67,010

[22] Filed: Jun. 29, 1987

[51] Int. Cl.$^4$ ............................................. F24J 2/52
[52] U.S. Cl. ................................. 126/437; 126/443; 126/450; 114/364
[58] Field of Search ............... 126/416, 427, 428, 431, 126/437, 443, 450, 441; 114/364

[56] References Cited

U.S. PATENT DOCUMENTS

| | | | |
|---|---|---|---|
| 2,388,940 | 11/1945 | Taylor | 126/437 X |
| 4,160,523 | 7/1979 | Stevens | 126/426 |
| 4,256,090 | 3/1981 | Imperiale | 126/427 |
| 4,324,226 | 4/1982 | Beck | 126/429 |
| 4,344,418 | 8/1982 | Leroy | 126/443 |
| 4,355,628 | 10/1982 | Watts | 126/427 |
| 4,537,180 | 8/1985 | Minor | 126/437 |

FOREIGN PATENT DOCUMENTS 2468077  5/1981  France ........................... 126/437

Primary Examiner—Samuel Scott
Assistant Examiner—Allen J. Flanigan
Attorney, Agent, or Firm—Cahill, Sutton & Thomas

[57] ABSTRACT

A solar water heater comprises a tank formed from dark colored, heat absorbent material, with an adapter fitting depending from the bottom of the tank for demountably mounting the heater in the deck ring of a boat. An upstanding neck is formed at the top of the neck, defining a fill port for filling the tank. A vented closure member is demountably carried in the neck of the tank and a removable transparent cover member is provided for fitting over the neck and enclosing the tank so as to retard the escape of solar energy. An outlet passage is formed in the adapter fitting, and coupling means are provided for coupling a water distribution element to the tank in order to deliver heated water below the deck of the boat.

20 Claims, 1 Drawing Sheet

SOLAR HEATER FOR MOUNTING ON A BOAT

BACKGROUND OF THE INVENTION

1. Field of the Invention

This invention relates in general to passive solar heaters and, more particularly, to a solar water heater for mounting in the deck ring of a boat.

2. Description of the Prior Art

It is generally desirable in large pleasure boats to provide a source of hot water for enabling overnight passengers to shower, wash dishes and so forth.

In certain power boats, water from a built-in or portable storage tank is pumped or otherwise circulated through a heat exchanger associated with the boat's engine, and delivered to its ultimate destination via a conventional plumbing system. This type of hot water distribution system is extremely costly, however, and thus is primarily limited to use in expensive luxury boats. In addition, the piping takes up an inordinate mount of space in the already crowded cabin and engine area of the boat.

In other boats, water may be stored in basins, and heated over propane or other gas burners when needed. The water may then be manually poured from the basin or delivered to a conventional water distribution system in any convenient fashion. This system also has a number of drawbacks, such as the cost and various hazards associated with improper use and storage of the gas for the heaters.

Some boat owners simply bring aboard large, dark-colored plastic bags which they fill up with water and leave on the deck to be heated by the sun. This, of course, is the most costeffective method of heating water, but is somewhat sloppy since the water-filled bags are bulky and unsightly. In addition, there is no satisfactory way of transporting the heated water from its location above-deck to a below-deck cabin where it is likely to be used.

Therefore, a need exists for a new and useful nautical hot water heater which overcomes some of the problems and shortcomings of the prior art.

SUMMARY OF THE INVENTION

In accordance with the present invention, a new and useful solar heater is provided for removable mounting in the deck ring of a boat.

The heater includes a tank having an upper shell portion formed from a heat absorbent material such as black plastic or metal. An upstanding neck formed at the top of the shell portion serves as a fill port through which water or other liquids may be poured. First fastening means are provided for retaining a vented closure member in or on the neck. Second fastening means are provided for securing a transparent cover member over the tank in spaced relationship thereto. Thus solar energy is retained between the tank and the cover by the greenhouse effect.

The bottom of the tank comprises an enlarged base plate which is welded or otherwise permanently secured in a watertight fashion to the lower edges of the shell portion. The base plate extends outwardly beyond the perimeter of the shell portion, defining a rim or ledge for supporting the cover member. An adapter fitting depends from the underside of the base plate for extending into or through the deck ring of the boat and securing the tank therein.

In one embodiment of the invention, the adapter fitting comprises a threaded boss adapted for threadingly engaging the threaded deck ring. A nipple or other coupling member is carried on the boss for attachment of a liquid distribution element such as a hose, pipe, faucet or shower head. An outlet passage extends through the nipple and communicates with the interior of the tank, allowing the liquid to exit therefrom.

In another embodiment of the invention, the adapter fitting comprises a threaded boss having both an outlet and an inlet passage formed therethrough. An on-off valve member is provided at the outlet passage for controlling the flow of liquid to a hose or other liquid distribution element. A screw coupling is provided at the inlet bore for attaching a valved fill hose for delivering pumped or pressurized liquid to the solar heated tank. This type of mounting element allows boat owners to fill the solar heated tank using a pre-existing, below-deck cold water distribution system as an alternative to pouring liquids through the above-deck fill port.

Accordingly, it is an object of the invention to provide a solar heated work tank with an adapter fitting for demountably mounting the tank in the deck ring of a boat.

Another object of the invention is to provide a boat-mounted water heater comprising a solar heated tank with a fill port located above the deck of the boat and an outlet portion extending below the deck for distributing hot water within the boat's cabin.

Another object of the invention is to provide a boat-mounted solar water tank enclosed within a transparent cover member for retaining solar energy by means of the greenhouse effect.

DESCRIPTION OF THE PREFERRED EMBODIMENTS

Figure 1:
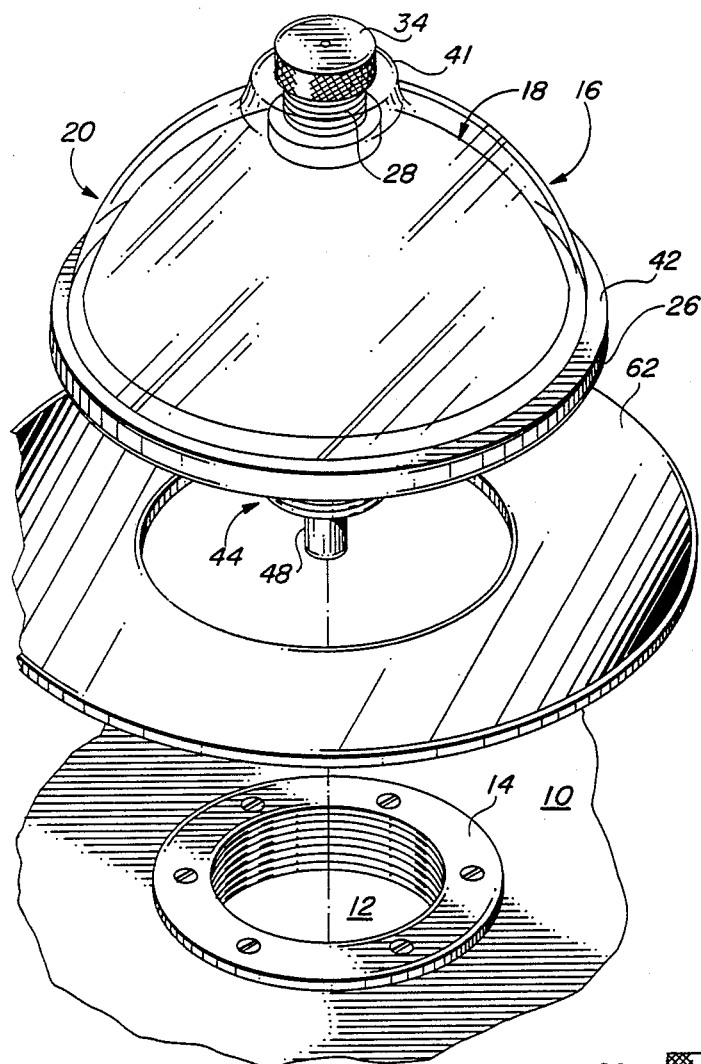
FIG. 1 is a perspective view showing the elements of the heater in exploded relation to the deck ring of a boat.

It is well known in the nautical arts to provide the deck 10 of a boat having a below deck cabin or hold with a ventilation opening 12 for allowing fresh air into the hold of the boat. The opening is typically reinforced by a deck ring 14 which is adapted to demountably receive a closure plate (not shown) for shutting off the opening 12 when ventilation is not required. The deck ring 14 has been shown for the purposes of illustration to be internally threaded so as to receive an externally threaded closure plate. It is not intended, however, that the apparatus of the present invention be limited strictly to use with threaded deck rings but can also be adapted for use with smooth bore deck rings of the type intended to receive the closure plate in a press or snap fit, or with deck rings of any other commonly available configuration, by means of simple and trivial modifications obvious to a practitioner of ordinary skill in the art.

The solar heater of the invention, which is indicated in its entirety by the numeral 16, comprises a tank 18 enclosed within a removable cover member 20. The tank 18 is made from a heat absorbent material such as black or dark colored metal or plastic, while the cover member 20 is made from transparent glass or plastic which is capable of admitting high amounts of solar radiation, but which is virtually opaque to any longer wavelength energy which is reradiated from the tank. Thus, solar energy is retained in the dead air space or zone 22 between the tank 18 and the cover member 20 by the well known greenhouse effect. Both the tank 18 and the cover 20 are illustrated here as hemispherical, but they may also be formed as concentric cylinders or other geometrical configurations having favorable radiative view factors.

The tank 18 includes an upper shell portion 24 which is welded or otherwise permanently secured to an enlarged base plate 26, with the shell and base plate cooperatively defining a water containment chamber 27. An upstanding hollow neck 28 formed at the top of the shell portion 24 defines a fill port 30 through which water or other liquids may be poured. First fastening means such as internal screw threads 32 are provided in or on the neck 28 for retaining a demountable closure means such as the illustrated plug 34 having suitable vent means 36 provided therein. Second fastening means such as external screw threads 38 are also provided on the neck 28 for demountably securing the cover member 20 thereto. The transparent cover 20 is formed with an upstanding boss 41 having an internally threaded bore which is in threaded engagement with the external threads 38 of the neck 28 when the cover 20 is mounted on the tank 18 as shown. A suitable stop collar 40 may be formed at the base of the neck 28 for spacing the cover member 20 an appropriate distance from the tank 18.

The enlarged base plate 26 extends outwardly beyond the perimeter of the shell portion 20, defining a rim or ledge 42 for supporting the bottom edges of the cover member 20. A sealing member in the form of a ring-shaped gasket 43 is mounted beneath the base plate 26 for engaging the top of the deck 10 to prevent tank cooling as a result of air movement below the base plate. In addition, an appropriate adapter fitting 44 is suitably attached such as by the illustrated threads, welding or the like so as to depend from the underside of the base plate 26 for extending into or through the deck ring 14 and demountably securing the tank therein.

Figure 2:
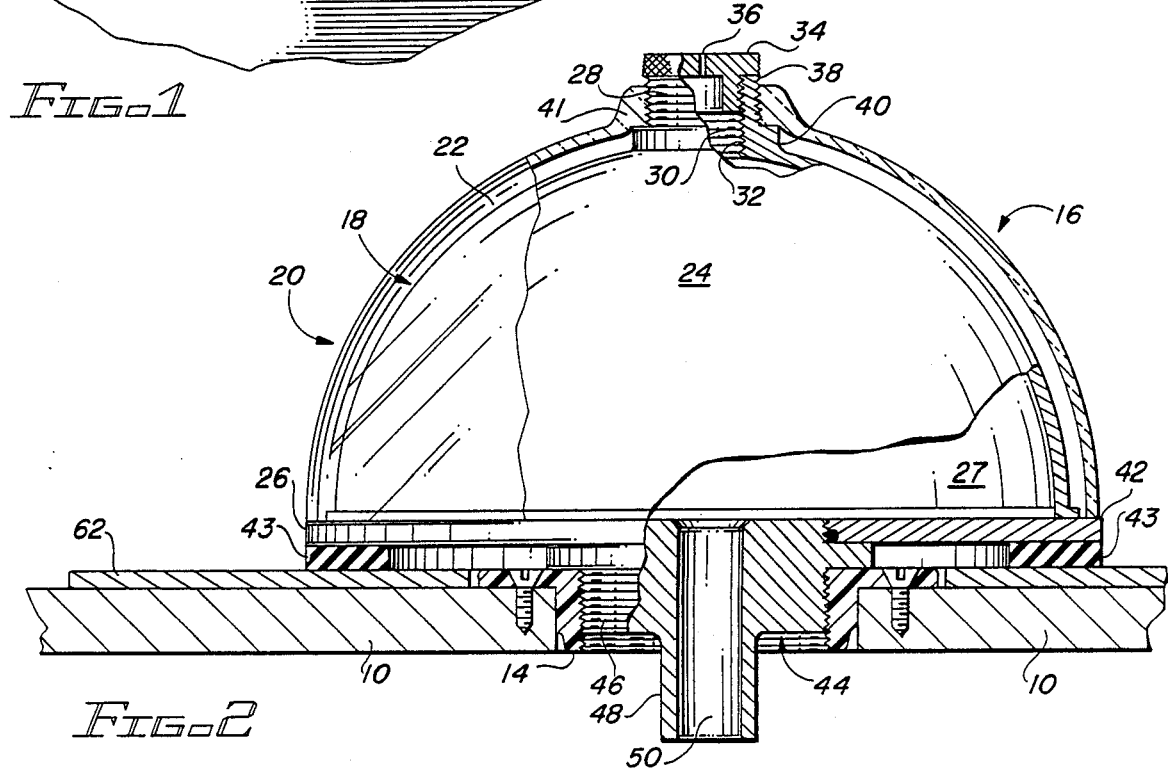
FIG. 2 is a sectional view of the heater according to the present invention, with portions broken away to show the elements thereof.

In the first embodiment of the invention, shown in FIGS. 1 and 2, the adapter fitting 44 comprises an externally threaded boss 46 adapted for threadingly engaging the threaded deck ring 14. A nipple 48 or other coupling member depends from the boss for attachment of a conventional liquid distribution element or system (not shown) such as a hose, pipe, faucet, shower head, or the like located beneath the deck 10. An outlet passage 50 extends through the nipple 48 and communicates with the interior 27 of the tank 18, allowing the liquid to exit therefrom. The nipple may also include a normally closed valve (not shown) which is held open when the distribution element is connected thereto.

Figure 3:
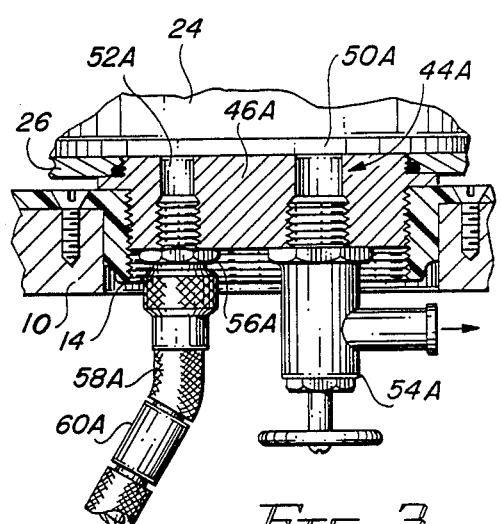
FIG. 3 is a fragmentary sectional view showing an alternative adapter fitting for use with the solar heater of the present invention.

In the second embodiment of the invention, shown in FIG. 3, the adapter fitting 44A comprises an externally threaded boss 46A having both an outlet passage 50A and an inlet passage 52A formed therethrough. An on-off valve means 54A is provided at the outlet passage 50A for controlling the flow of liquid to a hose or other liquid distribution member (not shown) for delivering hot water below the deck 10. A screw coupling 56A is provided at the inlet passage 52A for attaching a fill hose 58A having an inline, one way flow valve 60A.

This enables pumped or pressurized liquid to be delivered from a water storage tank (not shown) located beneath the deck 10, if the boat is equipped with such a tank, rather than being poured in through the above-deck fill port 30.

The untextured white fiberglass surfaces of most boat decks tend to act as natural reflectors which increase the efficiency of the solar heater 16. Thus, in extremely sunny environments, it may sometimes be necessary to remove cover member 20 from the tank 18 to prevent the liquid contained therein from becoming too hot. On the other hand, the surfaces of certain other types of boat decks such as those made of wood or those having dark and/or textured surfaces, tend to diminish the effectiveness of the heater. In such cases, a reflector member 82 such as an annular ring of thin gage aluminum or other shiny material, may be placed between the heater 16 and the deck 10 to direct additional solar energy at the tank 18.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those princples. The appended claims are therefore intended to cover and embrace any such modifications within the limits only of the true spirit and scope of the invention.

I claim as my invention:

1. A solar water heater for mounting on a boat deck having a deck ring defining an axial bore, said heater comprising:
   (a) a tank including an upper shell portion formed from a dark colored, heat absorbent material, and a base plate secured to the bottom of said shell portion, said shell portion and said base plate cooperatively defining a water containment chamber;
   (b) a neck portion at the top of said tank, said neck portion defining a fill port through which liquids may enter said chamber;
   (c) vented closure means demountably secured to said neck for closing said fill port;
   (d) an adapter fitting depending from said base plate and engageable with the deck ring for demountably mounting said tank above the bore of the deck ring, said fitting defining water passage port means communicating with said water containment chamber; and
   (e) coupling means associated with said adapter fitting for coupling a water distribution element to said fitting.

2. The solar water heater of claim 1, further comprising:
   (a) a transparent cover member for enclosing said tank so as to retard the escape of solar energy therefrom; and
   (b) fastening means on the neck of said tank for demountably securing said cover member thereto.

3. The solar water heater of claim 1, in which said water passage port means in said adapter fitting comprises a central outlet passage for allowing liquid to exit from said tank.

4. The solar water heater of claim 3, in which said coupling means comprises a nipple depending from said adapter fitting and formed concentrically around said outlet passage, for demountably carrying a water distribution element.

5. The solar water heater of claim 1, in which said water passage port means comprises an inlet port and an outlet port, with coupling means being provided at said inlet port for coupling a fill hose thereto.

6. The solar water heater of claim 5, further comprising a normally closed valve member at said outlet port for shutting off the flow of liquid from said tank.

7. The solar water heater of claim 1, in which said adapter fitting comprises a boss member depending from said base plate, the outer surface of said boss member being adapted to tightly engage the inner surface of the deck ring.

8. A solar water heater for mounting on a boat deck having a deck ring defining an axial bore, said heater comprising:
 (a) a tank including an upper shell portion formed from a dark colored, heat absorbent material, and an enlarged base plate secured to the bottom of said shell portion, said shell and said base plate cooperatively defining a water containment chamber;
 (b) an upstanding hollow neck formed at the top of said tank, said neck portion defining a fill port through which liquids may enter said chamber;
 (c) vented closure means demountably carried in said neck;
 (d) a removable cover member for enclosing said tank, said cover member being formed of transparent material which is capable of admitting high amounts of solar radiation but which is virtually opaque to any longer wavelength energy reradiated from the tank;
 (e) an upstanding boss on said cover member, said boss defining a bore for engaging the outer surface of said neck when said cover is mounted on said tank;
 (f) an adapter fitting depending from said base plate and engageable with the deck ring for demountably mounting said tank above the bore of the deck ring, said fitting defining water passage port means communicating with said water containment chamber; and
 (g) coupling means associated with said adapter fitting for coupling a water distribution element to said fitting.

9. The solar water heater of claim 8, in which said water passage port means in said adapter fitting comprises a central outlet passage for allowing liquid to exit from said tank.

10. The solar water heater of claim 9, in which said coupling means comprises a nipple depending from said adapter fitting and formed concentrically around said outlet pasage, for demountably carrying a water distribution element.

11. The solar heater of claim 8, in which said water passage port means comprises an inlet port and an outlet port, with coupling means being provided at said inlet port for coupling a fill hose thereto.

12. The solar water heater of claim 11, further comprising a normally closed valve member at said outlet port for shutting off the flow of liquid from said tank.

13. The solar water heater of claim 7, in which said adapter fitting comprises a boss member depending from said base plate, the outer surface of said boss member being adapted to tightly engage the inner surface of the deck ring.

14. The solar water heater of claim 8, in which said enlarged base plate extends outwardly beyond the perimeter of said shell portion, defining a ledge for supporting the bottom edges of said cover member.

15. A water heating assembly comprising in combination:
 (a) a deck ring for mounting in a deck of a boat, said deck ring defining an axial bore; and
 (b) a solar water heater demountably mounted in said deck ring, said solar water heater including,
  (I) a tank including an upper shell portion formed from a dark colored, heat absorbent material, and a base plate secured to the bottom of said shell portion, said shell portion and said base plate cooperatively defining a water containment chamber,
  (II) an upstanding hollow neck formed at the top of said tank, said neck portion defining a fill port through which liquids may enter said chamber,
  (III) vented closure means demountably secured to said neck for closing said fill port;
  (IV) a removable cover member enclosing said tank, said cover member being formed of transparent material which is capable of admitting high amounts of solar radiation but which is virtually opaque to any longer wavelength energy reradiated from the tank;
  (V) an upstanding boss on said cover member defining a bore for surrounding said neck of said tank; and
  (VI) elements of a demountable interconnection on the neck of said tank and in said bore of said cover member for removably securing said cover to said tank;
  (VII) an adapter fitting depending from said base plate and extending into and engagable with the bore of said deck ring for demountably securing said tank thereto, said adapter fitting defining a port means in liquid communication with the water containment chamber of said tank; and
  (VIII) coupling means associated with the port means of said adapter fitting for coupling a water distribution element to said adapter fitting.

16. The water heating assembly of claim 15, further comprising sealing means mounted beneath the bottom surface of said base plate for preventing cooling due to air movement therebelow.

17. The water heating assembly of claim 15, and further comprising:
 (a) said adapter fitting having a boss depending from said base plate for demountably securing said tank to said deck ring;
 (b) said coupling means being a nipple depending from the boss of said adapter fitting for attachment of a water distribution element thereto which delivers hot water below the boat deck;
 (c) said port means being in the form of an axial passage extending through said boss and said nipple.

18. The water heating assembly of claim 15 and further comprising:
 (a) said adapter fitting having a boss depending from said base plate for demountably securing said tank to said deck ring; and
 (b) said port mean including an inlet port and an outlet port extending through said boss of said adapter fitting, said inlet port being provided with means for coupling a fill hose thereto, and said outlet port having said coupling means associated therewith and being provided with a normally closed valve member for shutting off the flow of liquid from said tank.

19. The solar water heater of claim 15, in which said enlarged base plate extends outwardly beyond the perimeter of said shell portion, defining a ledge for supporting the bottom edges of said cover member.

20. The water heating assembly of claim 15, further comprising a stop collar formed at the base of said neck for spacing said cover member an appropriate distance from said tank.

* * * * *